(12) United States Patent
Bhide et al.

(10) Patent No.: US 11,539,808 B2
(45) Date of Patent: Dec. 27, 2022

(54) DYNAMIC ENABLEMENT OF AVAILABLE MODES

(71) Applicant: International Business Machines Corporation, Armonk, NY (US)

(72) Inventors: Manish Anand Bhide, Hyderabad (IN); Prashant Pandurang Mundhe, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/246,749

(22) Filed: May 3, 2021

(65) Prior Publication Data
US 2022/0353338 A1   Nov. 3, 2022

(51) Int. Cl.
| | | |
|---|---|---|
| H04L 67/54 | (2022.01) | |
| H04L 65/1096 | (2022.01) | |
| H04L 65/403 | (2022.01) | |
| H04L 65/1069 | (2022.01) | |
| H04L 12/18 | (2006.01) | |
| H04L 65/75 | (2022.01) | |
| G10L 15/26 | (2006.01) | |

(52) U.S. Cl.
CPC .......... *H04L 67/54* (2022.05); *H04L 12/1831* (2013.01); *H04L 65/1069* (2013.01); *H04L 65/1096* (2013.01); *H04L 65/403* (2013.01); *H04L 65/762* (2022.05); *G10L 15/26* (2013.01)

(58) Field of Classification Search
None
See application file for complete search history.

(56) References Cited

U.S. PATENT DOCUMENTS

| | | | | |
|---|---|---|---|---|
| 5,276,843 | A * | 1/1994 | Tillinghast | G11C 11/406 365/222 |
| 6,343,313 | B1 * | 1/2002 | Salesky | H04L 12/1822 715/752 |
| 7,330,875 | B1 * | 2/2008 | Parasnis | H04L 65/612 709/227 |
| 2005/0198133 | A1 * | 9/2005 | Karaki | H04N 9/3141 709/204 |
| 2006/0168007 | A1 | 7/2006 | Peters | |
| 2009/0125589 | A1 * | 5/2009 | Anand | H04L 65/1083 709/204 |
| 2011/0169910 | A1 * | 7/2011 | Khot | H04N 7/15 348/14.09 |
| 2012/0297305 | A1 * | 11/2012 | Hehmeyer | H04L 51/043 715/733 |

(Continued)

OTHER PUBLICATIONS

"How can we improve PowerPoint for Windows (Desktop Application)? Vote for an existing idea or share a new one", Downloaded Mar. 29, 2021, 5 pages.

(Continued)

*Primary Examiner* — Backhean Tiv
(74) *Attorney, Agent, or Firm* — Brian M. Restauro (57) ABSTRACT

Information associated with a user and a presentation made by the user is received. A presentation readiness of the user is dynamically detected. One or more of a presentation mode of a presentation software and a recording mode of the presentation software is initiated based on the received information and the dynamically detected presentation readiness.

20 Claims, 3 Drawing Sheets

(56) References Cited

U.S. PATENT DOCUMENTS

| | | | | |
|---|---|---|---|---|
| 2014/0372908 | A1* | 12/2014 | Kashi | H04L 65/1089 |
| | | | | 715/753 |
| 2015/0058748 | A1* | 2/2015 | Huang | G06F 3/0481 |
| | | | | 715/753 |
| 2016/0234264 | A1* | 8/2016 | Coffman | H04L 65/4053 |
| 2018/0152539 | A1* | 5/2018 | Bastide | H04L 12/1822 |
| 2018/0167426 | A1* | 6/2018 | Sigurdsson | H04L 67/02 |
| 2018/0255114 | A1* | 9/2018 | Dharmaji | H04L 65/403 |
| 2020/0293261 | A1* | 9/2020 | Janamanchi | H04L 12/1831 |
| 2021/0233525 | A1* | 7/2021 | Jaiswal | G10L 15/22 |
| 2022/0028411 | A1* | 1/2022 | Aher | H04L 65/80 |
| 2022/0058553 | A1* | 2/2022 | Stewart | G06V 20/52 |
| 2022/0271963 | A1* | 8/2022 | Shah | H04L 12/1818 |

OTHER PUBLICATIONS

"Method for avoiding interrupting applications during presentations", An IP.com Prior Art Database Technical Disclosure, Original Publication Date: Dec. 9, 2005, IP.com No. IPCOM000132353D,IP.com Electronic Publication Date: Dec. 9, 2005, 2 pages.

"Start the presentation and see your notes in Presenter view", Office Support, © Microsoft 2021, 9 pages, <https://support.microsoft.com/en-us/office/start-the-presentation-and-see-your-notes-in-presenter-view-4de90e28-487e-435c-9401-eb49a3801257>.

"Windows 7: Presentation Settings—Turn On or Off", Published by Brink, Apr. 6, 2009, 7 pages, <https://www.sevenforums.com/tutorials/6557-presentation-settings-turn-off.html>.

* cited by examiner

DYNAMIC ENABLEMENT OF AVAILABLE MODES

BACKGROUND

The present invention relates generally to the field of electronic presentations, and more particularly to dynamically enabling a available modes for an electronic presentation.

Many companies today utilize software applications for hosting business meetings. These applications allow the companies to save travel expenses (e.g., air travel, lodging, meals, etc.) and meet with virtually anyone across the globe on almost a moment's notice (providing all of the involved parties have access to the Internet or a cellular network). The meetings include intra-company and inter-company meetings that range from informal department meetings within a company to critical sales meetings that involve several different companies. Participants can connect to a business meeting using any of a number of computing devices such as a desktop computer, a laptop computer, a tablet computer, a smartphone, and the like.

SUMMARY OF THE INVENTION

Embodiments of the present invention include an approach for dynamically enabling a available modes for an electronic presentation. In one embodiment, information associated with a user and a presentation made by the user is received. A presentation readiness of the user is dynamically detected. One or more of a presentation mode of a presentation software and a recording mode of the presentation software is initiated based on the received information and the dynamically detected presentation readiness.

DETAILED DESCRIPTION

Embodiments of the present invention recognize that today's companies need to conduct business across the globe. Electronic meeting software enables said business to take place. Managers can present mission-critical project information to members of the manager's department and salesmen and saleswomen can present products to prospective buyers. During any presentation, the content being presented can be simple with minimal detail or complex with great detail. A presenter my try to include too much content on a single page of a presentation making it difficult for the meeting participants (i.e., the audience) to "see" (i.e., view) the content. Exacerbating the problem even more is a presenter who forgets to enable a presentation mode available in the electronic meeting application. Said presentation mode "fills" the presenter's screen, thus enabling the meeting participants more easily view the content being presented. A solution is needed that will dynamically enable a presentation mode included in electronic meeting software so that an audience can view the presentation without having to interrupt the presenter.

Embodiments of the present invention recognize that there may be a method, computer program product, and computer system for dynamically enabling available modes for an electronic presentation. The method, computer program product, and computer system improves the technology of the electronic meeting software by automatically activating the presentation mode after a user has launched a presentation instead of requiring the user to manually initiate said mode. Further, the method, computer program product, and computer system will dynamically initiate a recording mode of the presentation to capture said presentation for future viewing thus freeing the presenter from having to manually turn on the recording.

In an embodiment, information is received. In the embodiment, a presentation readiness is dynamically detected. Further in the embodiment, a presentation mode is initiated.

In another embodiment, a determination is made that a presentation mode is off. In the embodiment, a prompt to confirm readiness is transmitted. Further in the embodiment, a determination is made that recording is off. Further yet in the embodiment, a notification is transmitted. Further yet in the embodiment, an indication is received. Further yet in the embodiment, a recording is initiated.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
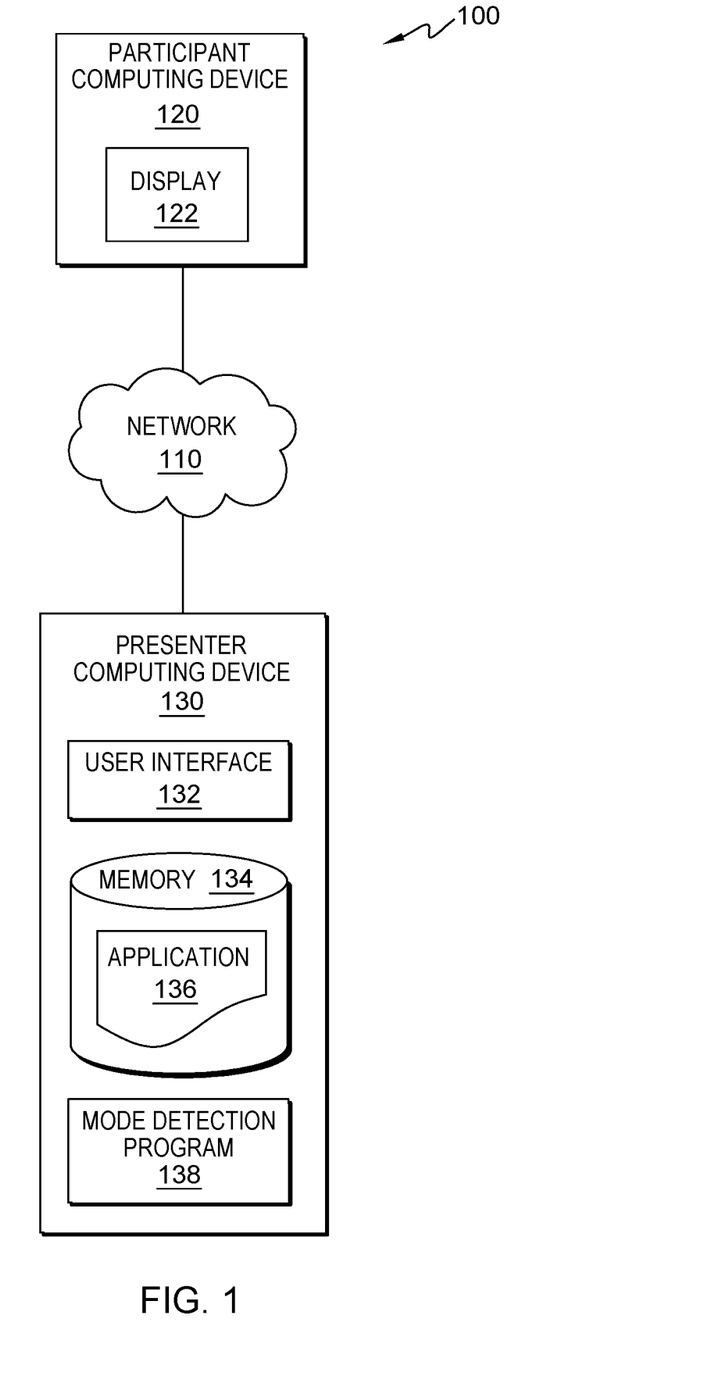
FIG. 1 depicts a functional block diagram illustrating a computing environment which includes a mode detection program, in accordance with an embodiment of the present invention.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes participant computing device 120 and presenter computing device 130 interconnected by network 110. In example embodiments, computing environment 100 includes other computing devices (not shown in FIG. 1) such as additional wearable technology, cell phones, smartphones, phablets, tablet computers, laptop computers, desktop computers, other computer servers, or any other computer system known in the art, interconnected with participant computing device 120 and presenter computing device 130 over network 110.

In embodiments of the present invention, participant computing device 120 and presenter computing device 130 are connected to network 110, which enables participant computing device 120 and presenter computing device 130 to access other computing devices and/or data not directly stored on participant computing device 120 and presenter computing device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between participant computing device 120 and presenter computing device 130, and any other computing devices (not shown in FIG. 1) connected to network 110, in accordance with embodiments of the present invention.

According to an embodiment, participant computing device 120 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, participant computing device 120 can be a standalone computing device, a management server, a web server, a mobile computing device, or any other electronic device or computing system capable of receiving, transmitting, and processing data. In other embodiments, participant computing device 120 can represent computing systems utilizing multiple computers as a server system, such as in a cloud computing environment. In certain embodiments, participant computing device 120 represents a computer system utilizing clustered computers and components (e.g., database server computers, application server computers, etc.) that act as a single pool of seamless resources when accessed by elements of computing environment 100. In general, participant computing device 120 is representative of any electronic device or combination of electronic devices capable of executing computer readable program instructions. According to one embodiment, participant computing device 120 is a computing device for viewing electronic presentations. In an embodiment, computing environment 100 includes any number of participant computing device 120. Participant computing device 120 may include internal and external hardware components as depicted and described in further detail with respect to FIG. 3, in accordance with embodiments of the present invention. In an embodiment, participant computing device 120 also includes display 122.

In an embodiment, display 122 is an electronic visual device for a desktop computer, laptop computer, tablet computer, smartphone, smart-watch, and the like. Display 122 may include a touchscreen which is an input device layered on top of the display for allowing a user to control an electronic device via simple or multi-touch gestures by touching display 122 with a special stylus and/or one or more fingers. Display 122 displays open programs and applications including electronic presentations, allowing a user of participant computing device 120 to interact with the open programs and applications via a keyboard and mouse (not shown in FIG. 1). Display 122 may be a thin film transistor liquid crystal display (TFT-LCD), a flat panel LED (light emitting diode) display, or a cathode ray tube (CRT). Display 122 may be connected to client computing device 120 via VGA (video graphics array), DVI (digital video interface), HDMI (High Definition Multi-Media Interface or any other connection type known in the art.

In an embodiment, presenter computing device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, presenter computing device 130 can be a standalone computing device, a management server, a web server, a mobile computing device, or any other electronic device or computing system capable of receiving, transmitting, and processing data. In other embodiments, presenter computing device 130 can represent computing systems utilizing multiple computers as a server system, such as in a cloud computing environment. In certain embodiments, presenter computing device 130 represents a computer system utilizing clustered computers and components (e.g., database server computers, application server computers, etc.) that act as a single pool of seamless resources when accessed by elements of computing environment 100. In general, presenter computing device 130 is representative of any electronic device or combination of electronic devices capable of executing computer readable program instructions. According to one embodiment, presenter computing device 130 is a computing device for sharing a presentation via an electronic conference. In an embodiment, computing environment 100 includes any number of presenter computing device 130. Presenter computing device 130 may include internal and external hardware components as depicted and described in further detail with respect to FIG. 3, in accordance with embodiments of the present invention. In an embodiment, presenter computing device 130 also includes user interface (UI) 132, memory 134, and mode detection program 138.

According to an embodiment, UI 132 provides an interface between a user of presenter computing device 130, participant computing device 120, and mode detection program 138. UI 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. UI 132 may also be mobile application software that provides an interface between presenter computing device 130, participant computing device 120, and mode detection program 138. Mobile application software, or an "app," is a computer program designed to run on smartphones, tablet computers and other mobile devices. UI 132 enables a user of presenter computing device 130 to interact with participant computing device 120, mode detection program 138, any other programs and applications included on presenter computing device 130 (not shown in FIG. 1), and any other computing devices (not shown in FIG. 1).

In an embodiment, memory 134 is storage that is written to and/or read by participant computing device 120, presenter computing device 130, mode detection program 138, and any other programs and applications on participant computing device 120 and presenter computing device 130. In one embodiment, memory 134 resides on presenter computing device 130. In other embodiments, memory 134 resides on participant computing device 120, on any other device (not shown in FIG. 1) in computing environment 100, in cloud storage, or on another computing device accessible via network 110. In yet another embodiment, memory 134 represents multiple storage devices within presenter computing device 130. Memory 134 may be implemented using any volatile or non-volatile storage media for storing information, as known in the art. For example, memory 134 may be implemented with a tape library, optical library, one or more independent hard disk drives, multiple hard disk drives in a redundant array of independent disks (RAID), solid-state drives (SSD), or random-access memory (RAM). Similarly, memory 134 may be implemented with any suitable storage architecture known in the art, such as a relational database, an object-oriented database, or one or more tables. In an embodiment of the present invention, participant computing device 120, presenter computing device 130, mode detection program 138, and any other programs and applications (not shown in FIG. 1) operating on presenter computing device 130 may store, read, modify, or write data to memory 134. In an embodiment of the present invention, data stored to memory 134 includes, but is not limited to, a software program or application that allows a presenter to share content via an electronic presentation and a presentation file. In the embodiment, memory 134 includes application 136.

According to an embodiment of the present invention, application 136 is a software program utilized by a user of presenter computing device 130 that enables the sharing of content to multiple participants via the Internet and/or a cellular network, or to participants in an audience such as a lecture hall. Application 136 is both singular (i.e., referring to a single application) and plural (i.e., referring to multiple applications). Application 136 is designed to allow a user of presenter computing device 130 to share information with a local and/or remote audience in an engaging manner such as with text, pictures, audio, and video.

In an embodiment of the present invention, mode detection program 138 is a program, a subprogram of a larger program, an application, a plurality of applications, or mobile application software, which functions to dynamically enable available modes for an electronic presentation. A program is a sequence of instructions written to perform a specific task. In an embodiment, mode detection program 138 runs independently. In other embodiments, mode detection program 138 depends on system software and/or other programs (not shown in FIG. 1) to execute. According to an embodiment, mode detection program 138 is a cognitive system based on artificial intelligence utilizing machine learning and deep learning which determines a user is utilizing presentation software to share content with an audience and further determines whether said user is utilizing an available presentation mode and/or an available recording feature included in the presentation software. Based on said determinations, mode detection program 138 communicates with said user and dynamically initiates the available presentation mode and/or recording feature. In one embodiment, mode detection program 138 functions as a stand-alone program residing on presenter computing device 130. In another embodiment, mode detection program 138 works in conjunction with other programs, applications, etc., found in computing environment 100. In yet another embodiment, mode detection program 138 resides on other computing devices such as participant computing device 120 in computing environment 100, which is interconnected to presenter computing device 130 via network 110.

According to an embodiment, mode detection program 138 receives information associated with a user utilizing presentation software. In the embodiment, mode detection program 138 dynamically detects presentation readiness related to said user. Further in the embodiment, mode detection program 138 initiates presentation mode in a dynamic manner for said user.

According to another embodiment, mode detection program 138 determines that an available presentation mode included in the presentation software is off. In the embodiment, mode detection program 138 transmits a prompt to said user to confirm readiness for dynamic initiation of the available presentation mode. Further in the embodiment, mode detection program 138 determines that a recording of the presentation is off. Further yet in the embodiment, mode detection program 138 transmits a notification to said user notifying the user that recording of the presentation will commence. Further yet in the embodiment, mode detection program 138 receives an indication from said user to begin recording. Further yet in the embodiment, mode detection program 138 dynamically initiates recording.

Figure 2A:
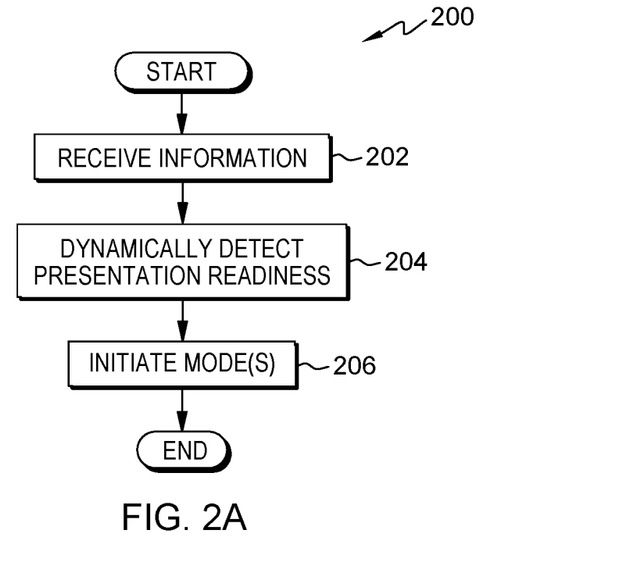
FIG. 2A is a flowchart depicting operational steps of a program for dynamically enabling available modes for an electronic presentation, on a computing device within the computing environment of FIG. 1, in accordance with an embodiment of the present invention.

FIG. 2A is a flowchart of workflow 200 depicting operational steps for dynamically enabling a presentation mode for an electronic presentation. In one embodiment, the method of workflow 200 is performed by mode detection program 138. In an alternative embodiment, the method of workflow 200 is performed by any other program in computing environment 100 working with mode detection program 138. In an embodiment, a user of presenter computing device 130 invokes workflow 200 upon accessing mode detection program 138. In another embodiment, workflow 200 and mode detection program 138 is invoked by a user of participant computing device 120. In yet another embodiment, workflow 200 is dynamically invoked upon a user of presenter computing device 130 launching application 136.

In an embodiment, mode detection program 138 receives information (step 202). In other words, mode detection program 138 receives information associated with a user and the information concerns the user's utilization of a computing device. According to an embodiment, the received information associated with the user includes, but is not limited to, (i) audio information; (ii) pattern-based actions of the user; (iii) screen sharing by the user; and (iv) utilizing a projector by the user. Audio information is received and interpreted by at least one of speech recognition and speech-to-text software; both receive audio information of the user and based on said audio information, determine that the user is sharing content via presentation software. For example, the user may mention a title of a presentation and briefly discuss the content of said presentation, the user may say "Good morning everyone, let's start the presentation" or "Now looking at the next slide . . . " while changing to a next slide during the course of the presentation. Pattern-based action information of the user includes mode detection program 138 detecting the user repetitively clicking "next slide" (i.e., selecting a "next slide" or a transition option) in the presentation software or clicking a "page down" key (i.e., a transition key) on a keyboard or hand-held device while speaking (without entering any content via a keyboard or touch-screen). The result of said action by the user during the presentation moves (i.e., transitions, advances forward, or moves backward) the presentation from a current slide to a next slide (e.g., from slide '3' to slide '4' or from slide '9' to slide '8'). Based on the received information, mode detection program 138 determines that the user is presenting content to an audience. The audience viewing the presented content is local (i.e., the audience is in the same location as the user presenting the content) and/or remote (i.e., the audience is in multiple locations and the content is shared via the Internet or a cellular network. An audience is a group of assembled spectators or listeners of presented content (e.g., a lecture, a movie, a play, a slide deck in a business meeting, etc.). In an embodiment, mode detection program 138 receives information associated with a presenter of content, said presenter is utilizing a presentation application for sharing content over the Internet. For example, Jill is giving a lecture to her remote high school physics class regarding the three laws of thermodynamics which includes various mathematical algorithms. Jill is using a presentation software package named 'SHOW' which is installed and stored on her laptop computer.

According to an embodiment of the present invention, mode detection program 138 dynamically detects presentation readiness (step 204). In other words, mode detection program 138 automatically detects the presentation readiness of the presenter (i.e., user) presenting the content. In an embodiment, mode detection program 138 dynamically detects presentation readiness by (i) determining that presentation mode is off; (ii) transmitting a prompt to the user to confirm readiness; (iii) determining that recording of the presentation is off; (iv) transmitting a notification to the user; (v) receiving an indication from the user; and (vi) initiating recording of the presentation. These six actions will be explained in greater detail below with respect to the FIG. 2B discussion.

In an embodiment, mode detection program 138 initiates mode(s) (step 206). In other words, mode detection program 138 initiates (i.e., turns on) at least one of an available presentation mode included in the presentation software in use for the presentation and a recording of the presentation. According to one embodiment, based on performing the several steps of FIG. 2B (discussed below), mode detection program 138 initiates presentation mode. In an embodiment, mode detection program 138 on presenter computing device 130 initiates a presentation mode included in application 136. For example, a mode detection program on Jill's laptop dynamically turns on the presentation mode included in the presentation software package 'SHOW' installed on her laptop. Because presentation mode is enabled, Jill's students find it easier to follow along with the thermodynamics lecture as the presented content appears larger in size (i.e., said content fills more of the area being viewed and less extraneous content is simultaneously presented).

According to another embodiment, mode detection program 138 initiates recording. In other words, mode detection program 138 dynamically initiates a recording mode to record the presentation. According to an embodiment, mode detection program 138 initiates the recording mode by enabling a recording feature included in the presentation software package. Said recording feature is able to capture at least one of (i) the content being presented from the time the recording was initiated and (ii) the content being presented from the time the presentation software package was launched (i.e., mode detection program 138 stores the content presented prior to recording being initiated and then appends said content to the content recorded after recording is initiated such that a complete recording of the presentation is created by mode detection program 138). In an embodiment, mode detection program 138 on presenter computing device 130 initiates the recording feature included in application 136. For example, the mode detection program on Jill's laptop initiates recording of the thermodynamics lecture being given by Jill to her high school physics class.

According to yet another embodiment, mode detection program 138 initiates both a presentation mode and a recording of the presentation. For example, the mode detection program on Jill's laptop dynamically initiates a presentation mode of the thermodynamics lecture and a recording of said lecture from the start of the lecture.

Figure 2B:
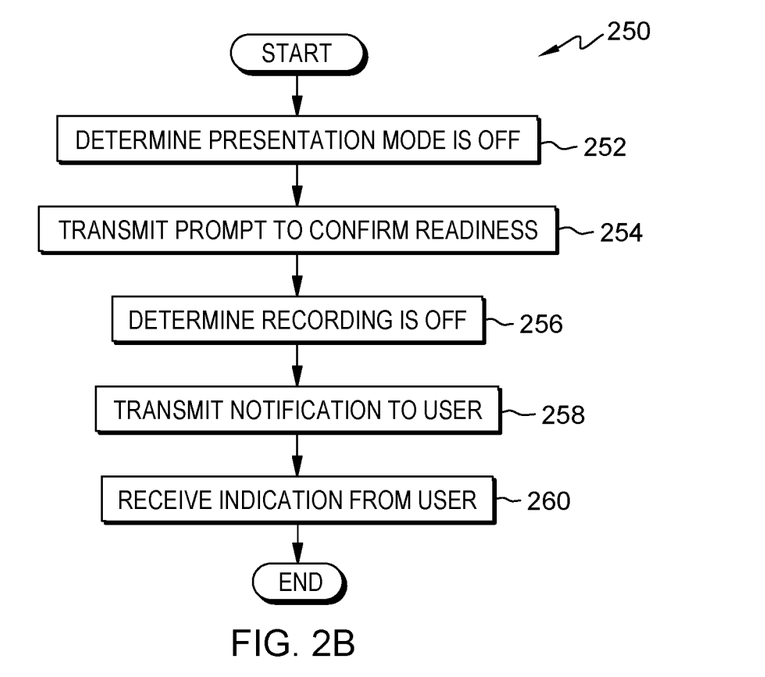
FIG. 2B is a flowchart depicting detailed steps for dynamically enabling a presentation mode for and a recording of an electronic presentation, in accordance with an embodiment of the present invention.

FIG. 2B is a flowchart of workflow 250 depicting operational steps for dynamically enabling a presentation mode and a recording for an electronic presentation. In one embodiment, the method of workflow 250 is performed by mode detection program 138. In an alternative embodiment, the method of workflow 250 is performed by any other program in computing environment 100 working with mode detection program 138. In an embodiment, a user of presenter computing device 130 invokes workflow 250 upon accessing mode detection program 138. In another embodiment, workflow 250 and mode detection program 138 is invoked by a user of participant computing device 120. In yet another embodiment, workflow 250 is dynamically invoked upon a user of presenter computing device 130 launching application 136.

According to an embodiment, mode detection program 138 determines presentation mode is off (step 252). In other words, responsive to receiving information associated with a user that is sharing content with an audience via presentation software, mode detection program 138 determines that presentation mode is off. In an embodiment, mode detection program 138 determines that presentation mode is off by detecting the enabled/disabled status (i.e., the enablement status) of an available presentation mode included in the presentation software or application being utilized by the presenter. If the available presentation mode is disabled, mode detection program 138 determines said presentation mode is off and thus, not being used by the presenter. If the available presentation mode is enabled, mode detection program 138 determines said presentation mode is on and thus, is being used by the presenter. Mode detection program 138 takes no further action related to presentation mode when the available presentation mode is in use. According to an embodiment, mode detection program 138 on presenter computing device 130 determines that the presentation mode included in application 136 is not enabled; therefore, mode detection program 138 determines that said presentation mode is off. For example, the mode detection program on Jill's laptop determines that the presentation mode included in 'SHOW' is disabled and thus, off.

In an embodiment, mode detection program 138 transmits prompt to confirm readiness (step 254). In other words, mode detection program 138 transmits a prompt (e.g., a notification) to presenter device 130 indicating that an available presentation mode will be dynamically initiated (i.e., turned on). According to an embodiment, mode detection program 138 transmits the prompt via any method known in the art including, but not limited to, a pop-up message, a blinking icon (e.g., an icon associated with a presentation mode blinks), and a haptic indication (e.g., a hand-held device vibrates). The prompt may include a response feature; for example, a 'NO' button icon in a pop-up message. If the user of presenter device 130 does nothing (in response to the transmitted prompt), mode detection program 138 proceeds. If the user utilizes the response feature (and thus, indicates 'NO', do not dynamically initiate presentation mode), mode detection program 138 takes no further action related to a presentation mode. In an embodiment, mode detection program 138 on presenter computing device transmits a prompt to the user of presenter computing device 130; said prompt is displayed in user interface 132 on presenter computing device 130. For example, the mode detection program on Jill's laptop transmits a prompt which is shown via a pop-up message on the display of the laptop indicating that presentation mode will by dynamically enabled.

According to an embodiment of the present invention, mode detection program 138 determines recording is off (step 256). In other words, mode detection program 138 determines that the recording option included in the presentation software is off. In an embodiment, mode detection program 138 determines that the recording is off by detecting that the recording of the presentation is not taking place. If recording is occurring, mode detection program 138 determines that recording is on; however, if recording is not occurring, mode detection program 138 determines that recording is not on and thus, is off. In an embodiment, mode detection program 138 on presenter device 130 determines that the recording of the presentation being made via application 136 is not occurring and thus, the recording is off. For example, the mode detection program on Jill's laptop determines that the thermodynamics lecture being given by Jill is not being recorded by the 'SHOW' software package.

In an embodiment, mode detection program 138 transmits notification to user (step 258). In other words, responsive to determining that recording is off, mode detection program 138 transmits a notification to the user of presenter computing device 130. According to an embodiment, mode detection program 138 transmits the notification via any method known in the art (as previously discussed). The notification includes a response feature to be used by the user of presenter computing device 130. The user will select one of a 'YES' (or 'approval') indication to record the presentation and a 'NO' (or 'disapproval') indication to not record the presentation. In an embodiment, mode detection program 138 on computing device 130 transmits a notification to computing device 130 which is shown on user interface 132. For example, the mode detection program on Jill's laptop transmits a notification to Jill which is displayed on the screen of the laptop.

According to an embodiment, mode detection program 138 receives indication from user (step 260). In other words, responsive to transmitting a notification concerning a recording of a presentation, mode detection program 138 receives an indication. In an embodiment, the received indication is one of a positive (i.e., 'YES') indication to enable recording of the presentation and a negative (i.e., 'NO') indication to not enable recording of the presentation. Mode detection program 138 takes no further action related to the recording of the presentation when the received indication is negative. The indication is received based on the user's utilization of the response feature included in the previously described transmitted notification. According to an embodiment of the present invention, mode detection program 138 on presenter computing device 130 receives an indication from the user of presenter computing device 130. For example, the mode detection program on Jill's laptop receives a positive indication from Jill via Jill's use of a response feature in the transmitted notification.

Figure 3:
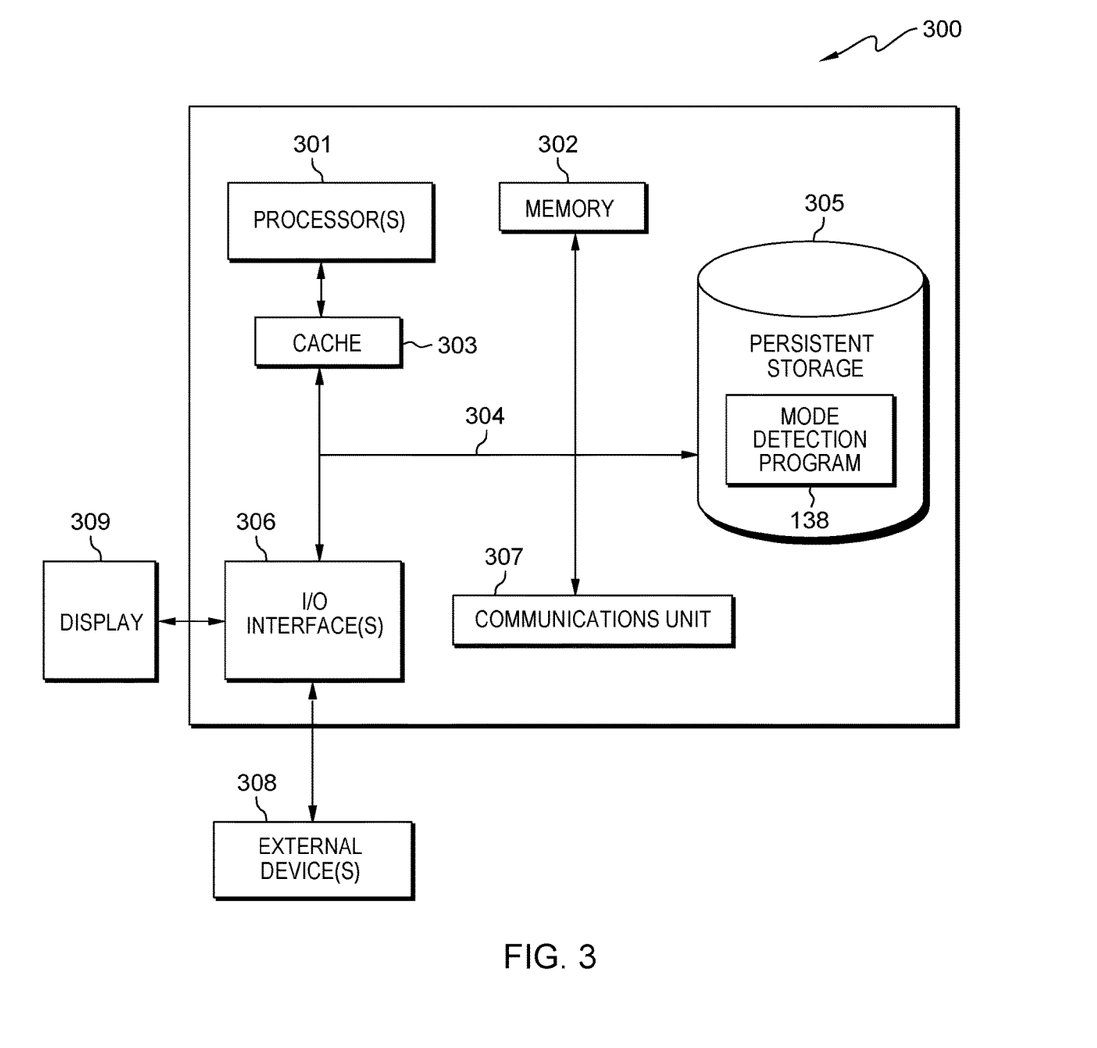
FIG. 3 depicts a block diagram of components of a computing device executing a mode detection program within the computing environment of FIG. 1, in accordance with an embodiment of the present invention.

FIG. 3 depicts computer system 300, which is an example of a system that includes mode detection program 138. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   receiving, by one or more computer processors, information associated with a user and a presentation made by the user;
   dynamically detecting, by one or more computer processor, a presentation readiness of the user; and initiating, by one or more computer processors, one or more of a presentation mode of a presentation software and a recording mode for the presentation based on the received information and the dynamically detected presentation readiness.

2. The method of claim 1, further comprising:

determining, by one or more computer processors, the presentation mode available in the presentation software is off;

transmitting, by one or more computer processors, a prompt to the user;

determining, by one or more computer processors, the recording option available in the presentation software is off;

transmitting, by one or more computer processors, a notification to the user; and receiving, by one or more computer processors, an indication from the user.

3. The method of claim 1, wherein the information associated with the user is selected from the group consisting of (i) audio information of the user; (ii) pattern-based actions of the user; (iii) screen sharing by the user; and (iv) utilizing a projector by the user.

4. The method of claim 2, wherein the step of determining, by one or more computer processors, the presentation mode available in the presentation software is off, comprises:

detecting, by one or more computer processors, an enablement status of the available presentation mode included in the presentation software.

5. The method of claim 2, wherein:

the notification to the user includes a response feature to be utilized by the user;

the response feature includes an 'approval' indication, wherein the 'approval' indication is an indication to record the presentation; and the response feature further includes a 'disapproval' indication, wherein the 'disapproval' indication is an indication to not record the presentation.

6. The method of claim 3, wherein:

the audio information is received and interpreted by at least one of speech recognition software and speech-to-text software; and a determination is made that the user is sharing content via the presentation software based on the interpreted audio information.

7. The method of claim 3, wherein:

the pattern-based actions of the user include one or more of the user speaking while repetitively selecting a transition option included in the presentation software and the user speaking while repetitively clicking a transition key on one of a keyboard and a hand-held device; and a result of either pattern-based action is to advance the presentation forward or move the presentation backward one slide from a current slide in the presentation.

8. The method of claim 1, wherein the initiated recording mode captures at least one of (i) presentation content being presented from a time the recording mode was initiated and (ii) the presentation content presented from a time the presentation software package was launched so that the presentation content presented prior to the recording mode being initiated is stored and appended to other presentation content recorded after the recording mode is initiated resulting in a complete recording of the presentation.

9. A computer program product, the computer program product comprising:

one or more computer readable storage media; and program instructions stored on the one or more computer readable storage media, the program instructions comprising:

program instructions to receive information associated with a user and a presentation made by the user;

program instructions to dynamically detect a presentation readiness of the user; and program instructions to initiate one or more of a presentation mode of a presentation software and a recording mode for the presentation based on the received information and the dynamically detected presentation readiness.

10. The computer program product of claim 9, further comprising program instructions stored on the one or more computer readable storage media, to:

determine the presentation mode available in the presentation software is off;

transmit a prompt to the user;

determine the recording option available in the presentation software is off;

transmit a notification to the user; and receive an indication from the user.

11. The computer program product of claim 9, wherein the information associated with the user is selected from the group consisting of (i) audio information of the user; (ii) pattern-based actions of the user; (iii) screen sharing by the user; and (iv) utilizing a projector by the user.

12. The computer program product of claim 10, wherein the program instructions to determine the presentation mode available in the presentation software is off, comprises:

program instructions to detect an enablement status of the available presentation mode included in the presentation software.

13. The computer program product of claim 10, wherein:

the notification to the user includes a response feature to be utilized by the user;

the response feature includes an 'approval' indication, wherein the 'approval' indication is an indication to record the presentation; and the response feature further includes a 'disapproval' indication, wherein the 'disapproval' indication is an indication to not record the presentation.

14. The computer program product of claim 11, wherein:

the audio information is received and interpreted by at least one of speech recognition software and speech-to-text software; and a determination is made that the user is sharing content via the presentation software based on the interpreted audio information.

15. The computer program product of claim 11, wherein:

the pattern-based actions of the user include one or more of the user speaking while repetitively selecting a transition option included in the presentation software and the user speaking while repetitively clicking a transition key on one of a keyboard and a hand-held device; and a result of either pattern-based action is to advance the presentation forward or move the presentation backward one slide from a current slide in the presentation.

16. The computer program product of claim 9, wherein the initiated recording mode captures at least one of (i) presentation content being presented from a time the recording mode was initiated and (ii) the presentation content presented from a time the presentation software package was launched so that the presentation content presented prior to the recording mode being initiated is stored and appended to other presentation content recorded after the recording mode is initiated resulting in a complete recording of the presentation.

17. A computer system, the computer system comprising:
one or more computer processors;
one or more computer readable storage media; and
program instructions stored on the one or more computer readable storage media for execution by at least one of the one or more computer processors, the program instructions comprising:
program instructions to receive information associated with a user and a presentation made by the user;
program instructions to dynamically detect a presentation readiness of the user; and
program instructions to initiate one or more of a presentation mode of a presentation software and a recording mode for the presentation based on the received information and the dynamically detected presentation readiness.

18. The computer system of claim 17, further comprising program instructions stored on the one or more computer readable storage media for execution by at least one of the one or more computer processors, to:
determine the presentation mode available in the presentation software is off;
transmit a prompt to the user;
determine the recording option available in the presentation software is off;
transmit a notification to the user; and
receive an indication from the user.

19. The computer system of claim 17, wherein the information associated with the user is selected from the group consisting of (i) audio information of the user; (ii) pattern-based actions of the user; (iii) screen sharing by the user; and (iv) utilizing a projector by the user.

20. The computer system of claim 18, wherein the program instructions to determine the presentation mode available in the presentation software is off, comprises:
program instructions to detect an enablement status of the available presentation mode included in the presentation software.

* * * * *